Jan. 12, 1943.  M. L. KAPLAN  2,308,369
COLLAR AND METHOD OF MAKING SAME
Filed May 7, 1942  3 Sheets-Sheet 1
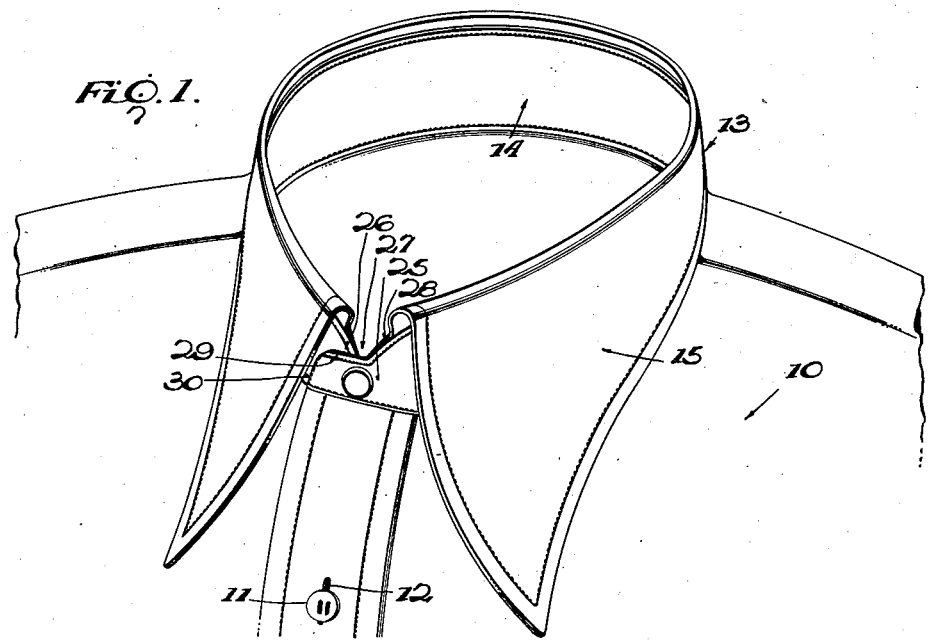
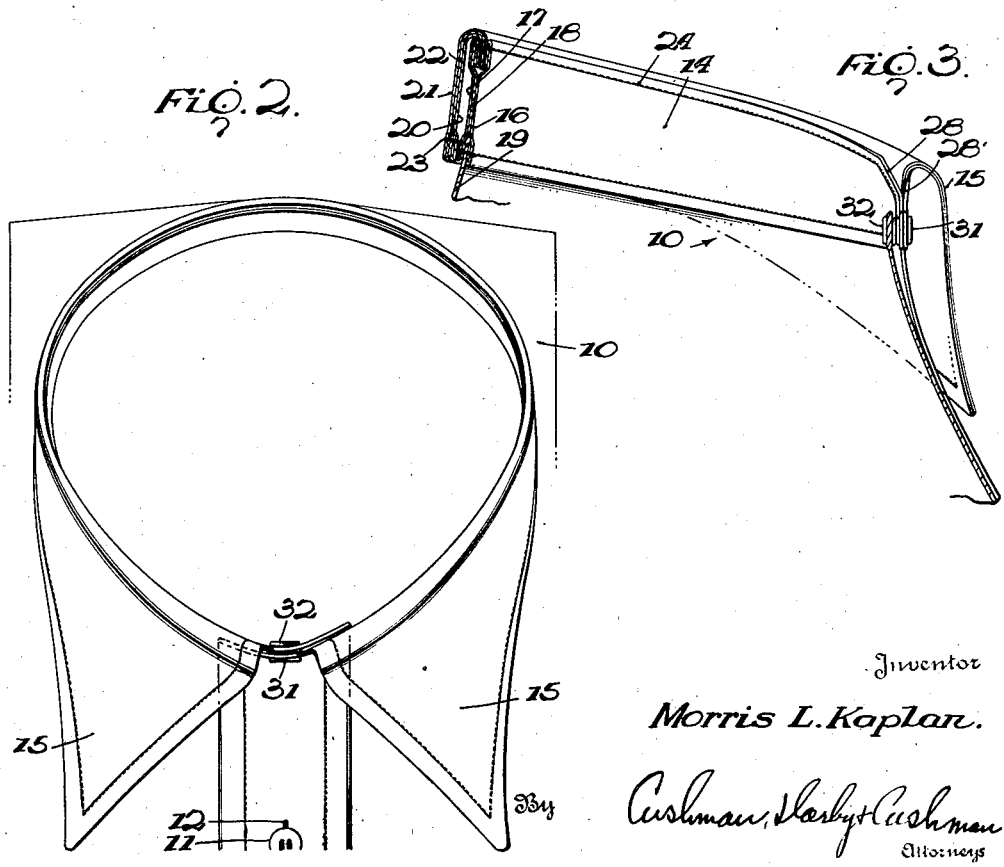
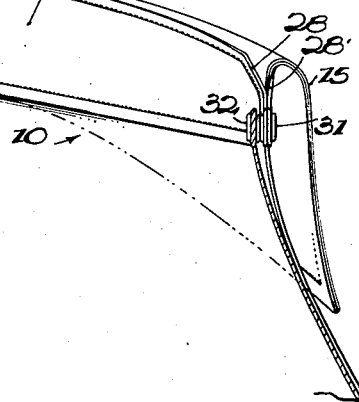
Inventor
Morris L. Kaplan.
By Cushman, Darby & Cushman
Attorneys

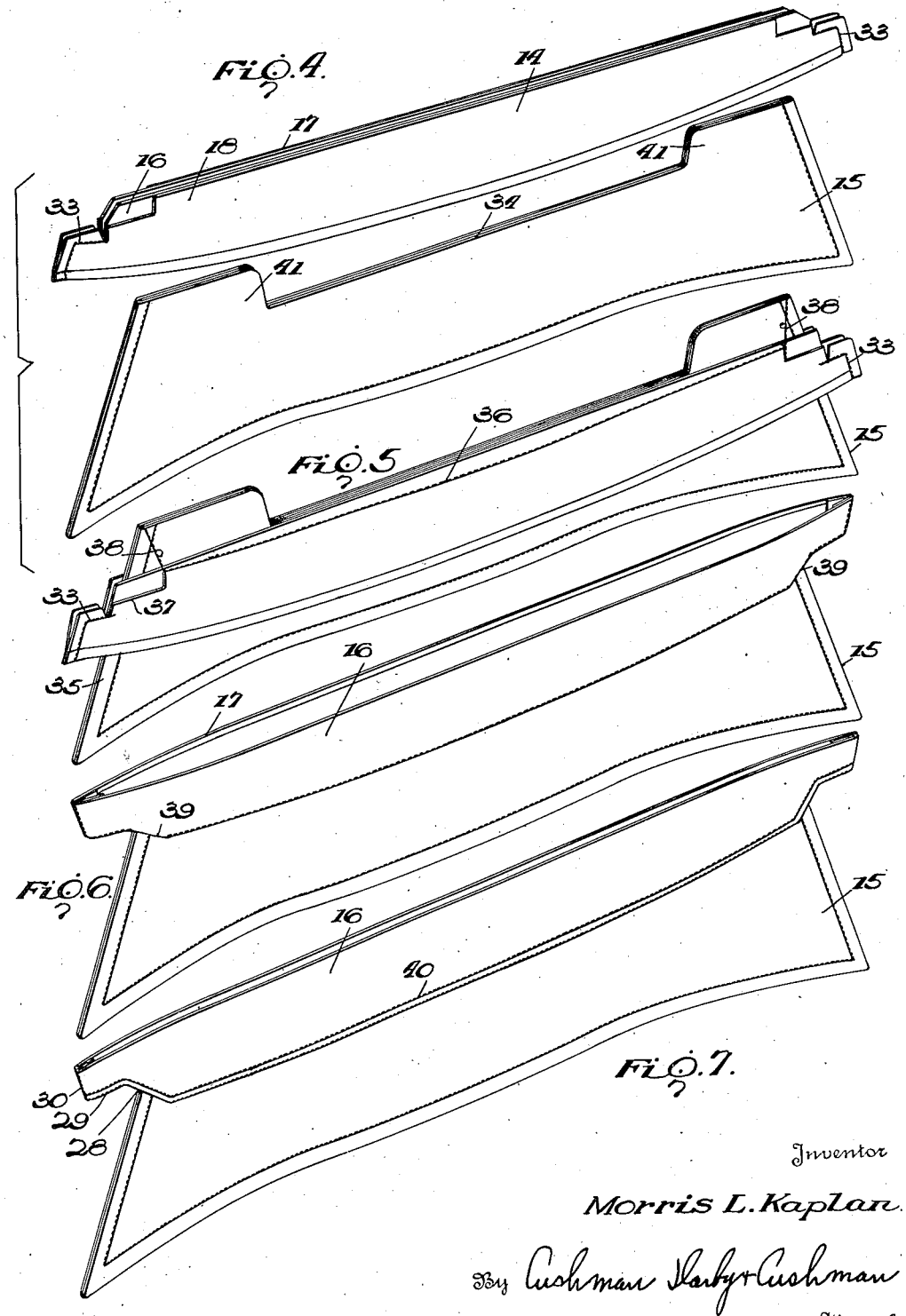

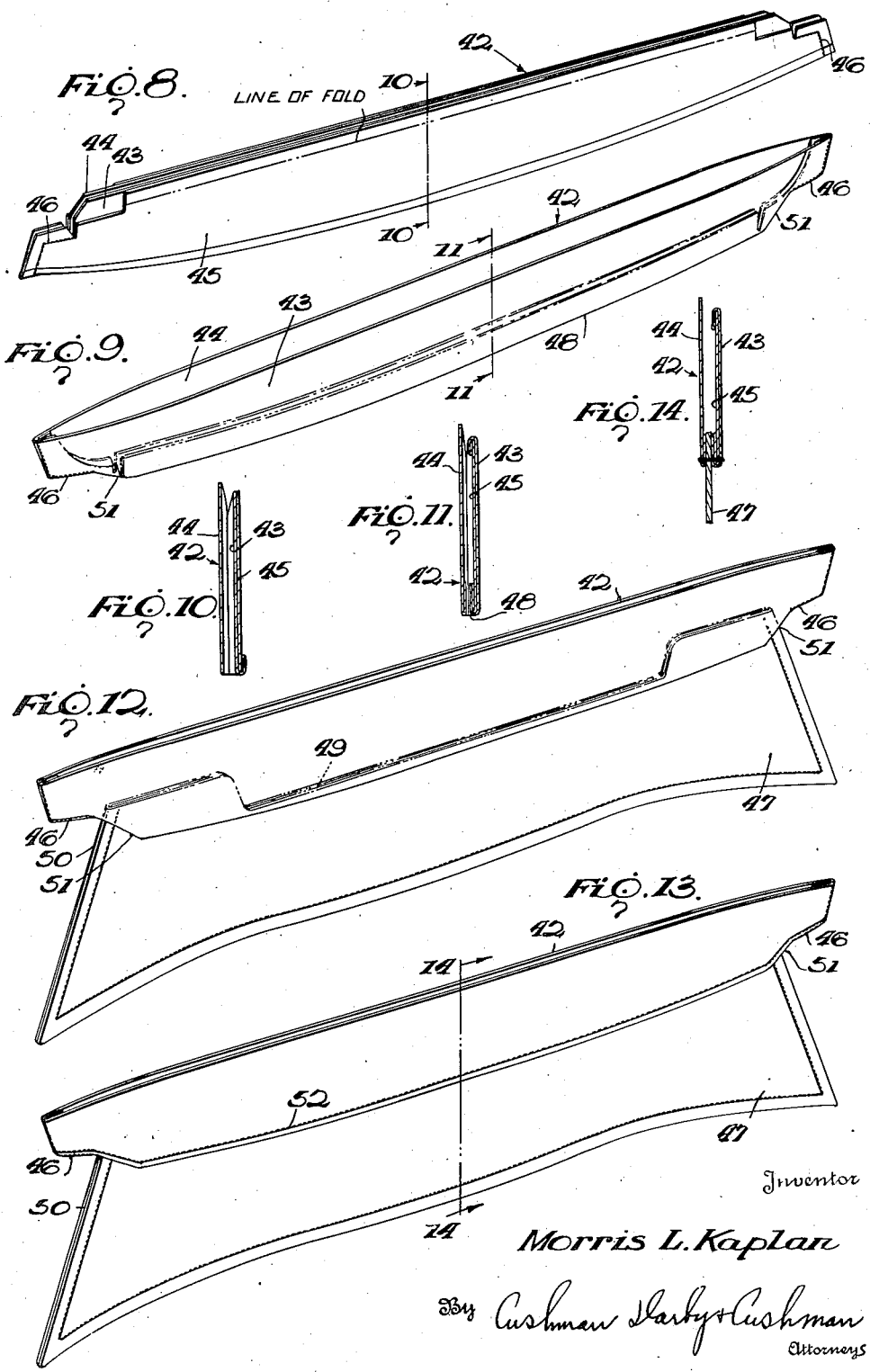

Patented Jan. 12, 1943

2,308,369

UNITED STATES PATENT OFFICE 2,308,369

COLLAR AND METHOD OF MAKING SAME

Morris L. Kaplan, Hazleton, Pa., assignor to The Shirtcraft Company, Inc., Hazleton, Pa,. a corporation of New York Application May 7, 1942, Serial No. 442,087

6 Claims. (Cl. 2—131)

The present invention relates to collars and the method of making the same and refers particularly to soft turndown collars of the type which are permanently attached to shirts.

An object of the invention is the provision of a turndown collar which is particularly constructed to produce a decided rolled edge, contributing substantially to the appearance of the collar.

Another object is to provide a collar of this character having a collar band formed at its front ends with reduced portions which cooperate to provide a tie knot receiving notch. Furthermore, the top edges of the ends of the collar band which form the notch slope downwardly from points inwardly of and extend across the front ends of the turndown portion of the collar. This not only contributes to the rolled effect of the collar, but furnishes sufficient space for the tie knot, as well as providing a long wearing collar which is comfortable to the neck.

A further object is the provision of a novel method for making a collar having these characteristics and in which the objectionable feature of producing cracked stitches is eliminated.

With the foregoing and other objects in view, the invention will now be more particularly described, reference being had to the accompanying drawings, in which:

Figure 1 is a fragmentary front elevation of a shirt having an attached collar made in accordance with my invention;

Figure 2 is a top plan view thereof;

Figure 3 is a section on line 3—3 of Figure 2;

Figure 4 discloses the first step in the method of forming the collar, and shows the turndown collar portion and collar band prior to being secured together;

Figure 5 discloses the next step wherein the collar band is overlaid on the turndown portion of the collar;

Figure 6 discloses the collar band attached to the collar and with its plies turned over;

Figure 7 discloses the complete collar prior to its attachment to the shirt;

Figure 8 discloses the first step in another method of forming the collar and shows the collar band with its plies stitched together at opposite ends;

Figure 9 discloses the next step, wherein the plies of the collar band are turned over and creased upon the unfinished longitudinal edges thereof;

Figure 10 is a section taken on line 10—10 of Figure 8;

Figure 11 is a section taken on line 11—11 of Figure 9;

Figure 12 discloses the next step, wherein the turned down collar portion is inserted between the turned over and creased plies of the collar band;

Figure 13 discloses the complete collar prior to its attachment to the shirt, and Figure 14 is a section taken on line 14—14 of Figure 13.

The collar of the present invention is illustrated in Figures 1 to 3 as being permanently secured to a shirt, forming therewith a collar-attached shirt. In these figures the numeral 10 designates the shirt body, which is open at its front throughout its height and provided with the usual button and button holes 11 and 12, respectively, for fastening the overlapping front ends of the shirt together. The collar 13 comprises a collar band 14 and a turndown collar portion 15. The collar band may consist of any number of strips or plies, and in the present instance is disclosed as having inner and outer plies 16 and 17, respectively, and a reinforcing strip or ply 18, the latter being secured to the inner ply in the usual manner, that is, with the lower longitudinal edge of the inner ply turned over and around the lower edge of the reinforcing ply and stitched thereto (see Figure 3). The lower inturned edges of the plies 16 and 17 overlie and are stitched to the unfinished top edge 19, as also clearly shown in Figure 3.

The turndown collar portion 15 may also be formed of any desired number of plies, but in the present invention is disclosed as consisting of inner and outer plies 20 and 21, respectively, and a reinforcing strip or ply 22. In this construction and also referring to Figure 3, it will be observed that the lower longitudinal edge of the outer ply 21 is turned over the lower edge of the reinforcing strip 22. The lower longitudinal edge of the inner ply 20 is also inturned and all three of these plies are secured together by a line of stitching 23. The upper unfinished longitudinal edges of the plies 20, 21, and 22 are secured between the upper inturned longitudinal edges of the inner and outer plies 16 and 17 of the collar band by a line of stitching 24. The novel method of securing the collar band to the turndown collar portion will be described in detail hereinafter.

Referring particularly to Figure 1, it will be observed that the front ends 25 and 26 of the collar band are considerably reduced in height with respect to the rest of the collar band so as to provide a tie knot receiving notch 27. This notch is formed by constructing the front ends 25 and 26 so that each top edge thereof slopes downwardly from a point inwardly of the respective front edge of the turndown collar portion. This sloping portion is designated by the numeral 28, and as clearly shown in Figure 3, the top edge starts to slope or incline from a point between one-half to three-quarters of an inch inwardly from the front edge of the turndown collar portion. Each sloping top edge of the collar band extends across its respective front end of the turndown collar portion to form with the other sloping front end of the collar band, the notch 27 which is substantially V-shaped in formation.

In the drawings each sloping edge 28 is shown as continuing in a substantially straight line, but it is to be understood that this edge may be slightly curved, if desired. Each sloping edge 28 merges into a horizontal edge portion 29 which connects with a substantially vertical straight edge 30. At points directly below the lower ends of the sloping or inclined edges 28, the ends of the collar band are provided with separable fastener elements 31 and 32. As clearly shown in Figure 1, when these elements are snapped together, they are located directly below the base of the V-shaped notch 27. While the ends 25 and 26 of the collar band have been designated as terminating in straight edges 29 and 30, it is to be understood that the collar may be finished off in any other desired manner, so long as the sloping or inclined edges 28 cooperate to form the V-shaped notch 27.

In addition to providing a tie knot receiving notch, the above described construction also gives the collar a pronounced rolled edge which contributes substantially to the appearance of the collar. This is due primarily to the fact that the edge of the present collar does not start at the top of the fold of the turndown portion, as is usual in the ordinary type of collar. Referring particularly to Figure 3, it will be observed that the rolled edge actually starts at a point 28' somewhat below the top of the turndown portion. This is due to the fact that the sloping edge 28 of the collar band crosses the edge of the turndown portion at a point somewhat below the top of the collar, thus providing an additional free front edge portion which contributes to the pronounced rolled effect.

Referring now to Figures 4 to 7, there is disclosed the successive steps in the method of forming and assembling the collar band 14 and the turndown portion 15 of the collar. As shown in Figure 4, the opposite ends of the collar band are reduced in height to form tab members, and lines of stitching 33 secure the several plies together. It will be observed, however, that these lines of stitching do not extend very far inwardly of the ends of the collar band, and leave sufficient space to readily permit the unfinished edge 34 of the turndown collar portion to be inserted between the inner and outer plies 16 and 17 of the collar band.

After the plies of the collar band have been stitched, as shown in Figure 4, the turndown portion 15 is inserted between the plies 16 and 17, as illustrated in Figure 5. In this view it will be observed that the inner extremities of the lines of stitching 33 are quite close to the front edges 35 of the turndown collar portion. However, in view of the fact that the edges 35 are sloping or inclined, the lines of stitching 33 will be spaced from the front edges 35 to the desired extent after the collar band plies have been turned over, as will be hereinafter described.

After the collar band and turn-down portion 15 have been brought together, as shown in Figure 5, the unfinished longitudinal edge of the collar band is stitched adjacent the unfinished longitudinal edge of the turndown portion 15 by a line of stitching 36. This line of stitching in each instance terminates at a point inwardly from the front edge 35 of the collar to leave an unstitched space or area 37. Each end of the line of stitching 36 is terminated by extending the stitching at substantially right angles to the edge of the collar band and bringing the stitching to the top unfinished edge of the turndown portion 15, as shown at 38, Figure 5. In this manner there will be no possibility of creating cracked stitches, since the lines of stitching will not extend over and beyond the front edges of the turndown collar portion. Thus, when the collar band is subsequently turned, there will be no stitching at these points.

After the collar band has been stitched to the turndown portion 15, as shown in Figure 5, the plies 16 and 17 are completely reversed or turned over to the position shown in Figure 6. This leaves a turned over, unstitched section 39 adjacent each end of the collar, which slopes or tapers downwardly across the front edge of the turned down portion and cooperates to form one of the reduced end portions or tab members of the collar band. As pointed out above the unstitched section 39 extends beyond the respective front edge of the collar portion. This distance may be anywhere from a quarter inch to three-quarters of an inch, as desired.

The next and final operation prior to attaching the collar band to the shirt, as hereinbefore described, consists in providing a line of overstitching 40 along the longitudinal edge of the collar band. This line of over-stitching, in addition to passing along the previously stitched portion of the collar band, also passes over the unstitched sections or areas 37 and continues to the end portions of the collar band. By reason of the fact that each section 37 is left unstitched, the objectionable feature of providing cracked stitches is eliminated. Furthermore, this portion of the collar provides a neater appearance than if the areas 37 had been stitched prior to reversing or turning over the plies 16 and 17. It will be observed that the unfinished edge 34 of the turndown collar portion is of greater height at its ends, and provides sections 41 which are located between the plies 16 and 17 of the collar band when the latter is reversed or turned over. This is primarily designed to give a stiffening effect to the front of the collar and prevent wrinkling of the collar band at this point. Subsequent to the over-stitching operation, the collar band is attached to the shirt 10 as illustrated in Figures 1 to 3.

Referring now to Figures 8 to 14, there is disclosed the successive steps of another method of forming and assembling the collar band and the turned down collar portion.

As in Figure 4, the collar band 42 may consist of any number of strips or plies, but is disclosed as having inner and outer plies 43 and 44, respectively, and a reinforcing strip or ply 45, the latter being secured to the inner ply in the usual manner; that is, with the lower longitudinal edge of the inner ply turned over and around the lower edge of the reinforcing ply and stitched thereto.

The collar band 42, like the band 14, has its opposite ends reduced in height to form tab members and is provided with lines of stitching 46 securing the several plies together at their opposite ends (see Figure 8).

As distinguished from the previously described method, the collar band 42 is not initially associated with, and stitched to, the turned down collar portion 47. Instead, however, the plies 43, 44, and 45 of the collar band are first turned over upon the top unfinished longitudinal edges of the plies and then ironed or creased to provide smooth finished edge portions designated as 48 in Figure 9. Thereafter the turned down collar portion 47 is inserted between the turned and creased plies of the collar band, so that the unfinished longitudinal edge 49 of the turned down collar portion is completely received within the turned over and creased plies of the collar band, as clearly shown in Figure 12. In this step of the method, it will be observed that the front edges 50 of the turned down collar portion are positioned within, and adjacent to, the inner edges of the lines of stitching 46, so that, similarly to the previously described method, the portions of the collar band which pass over the front ends of the turned down collar portion are unstitched. As previously stated, the ends of the collar band 42 are reduced in height and provided with sloping portions 51 which pass over the front edges 50 of the turned down collar portion to form tab members.

After the turned down collar portion 47 has been inserted between the turned over plies of the collar band, as shown in Figure 12, the next and final step before attaching the collar to a shirt consists in providing a line of over-stitching 52 along or adjacent to the longitudinal edge of the collar band. As distinguished from the previously described method, it will be observed that this is the only line of stitching which connects the turned down collar portion to the plies of the collar band. This line of stitching not only passes along the unstitched longitudinal edge portions of the collar band, but also passes over the previously stitched portions 46 of the collar band.

This method likewise eliminates the objectionable feature of providing cracked stitches and gives a neat appearance to the finished collar. It will be understood, of course, that the collar formed by this last described method has all of the advantages and characteristics of the collar shown in Figures 1 to 3. In fact, regardless of which method is utilized, the final form and appearance of the collar is substantially the same as that disclosed in Figure 1.

While the collar forming the subject of the present invention is designed to be permanently attached to a shirt and form a part of a collar-attached shirt, nevertheless, it is to be understood that it is capable of being used and worn as a separate unit which may be detached from a shirt body. Furthermore, while the above described methods are the preferred ones, applicant does not limit himself to the precise steps illustrated. For instance, instead of initially stitching the reduced ends of the plies of the collar band by the lines of stitching 33 and 46, this stitching may be performed after the unfinished edge of the turndown portion has been inserted between the plies of the collar band.

It is to be further understood that the form of the invention shown and described is illustrative of the preferred embodiment, and that such changes may be made, without departing from the spirit of the invention, as fall within the purview of one skilled in the art and the scope of the appended claims.

I claim:

1. A collar comprising a collar band, and a turndown collar portion secured to the upper edge of said collar band, the top edge of each end portion of said collar band sloping downwardly from a point inwardly of and at least to a front end of the collar portion, each sloping end portion of the collar band being below the fold line of the collar at the point where it meets its respective front end of the turndown collar portion to provide said turndown collar portion with rolled front edges, each of which starts below the normal top edge of the collar band.

2. A collar comprising a collar band, and a turndown collar portion secured to the upper edge of said collar band, the top edge of each end portion of said collar band sloping downwardly from a point inwardly of and extending across a front end of the turndown collar portion to form with the other front end of the collar band a substantially V-shaped notch for the reception of a tie knot, each sloping end portion of the collar band being below the fold line of the collar at the point where it passes across its respective front end of the turndown collar portion to provide said turndown collar portion with rolled front edges.

3. A collar comprising a collar band, and a turndown collar portion secured to the upper edge of said collar band, the top edge of each end portion of said collar band sloping downwardly from a point inwardly of and extending across a front end of the turndown collar portion to form with the other front end of the collar band a substantially V-shaped notch for the reception of a tie knot, each sloping end portion of the collar band being below the fold line of the collar at the point where it passes across its respective front end of the turndown collar portion to provide said turndown collar portion with rolled front edges a fastener secured to one end portion of the collar band, a fastener secured to the other end portion of the collar band and cooperating with said first fastener to secure the ends of said collar band together, said fasteners being located below the base of the V-shaped notch and functioning to preserve the notch, with the upper ends thereof spaced apart to receive the tie knot.

4. The method of making a collar having a turndown collar portion and a collar band having at least two plies, comprising forming the top edges of the end portions of the collar band of less height than the top edge of the rest of the collar band to form tab members, stitching together the plies of the tab members, inserting the turndown collar portion between the plies, so that the adjacent front edges of the turndown collar portion are located inwardly of the stitched tab members, stitching the collar band to the turndown collar portion and terminating the line of stitching inwardly of the front edges of the turndown collar portion, thereby leaving unstitched portions which extend across the front edges of the turndown collar portion, turning over the collar band upon the turndown collar portion, and then overstitching the top longitudinal edge of the collar band including the formerly unstitched portions thereof.

5. The method of making a collar having a turndown collar portion and a collar band having at least two plies, comprising forming the top edges of the end portions of the collar band of less height than the top edge of the rest of the collar band to form tab members, stitching together the plies of the tab members, inserting the turndown collar portion between the plies so that the adjacent front edges of the turndown collar portion are located inwardly from the inner extremities of the line of stitching connecting the plies of the tab members and with one longitudinal edge of each ply located adjacent the unfinished longitudinal edge of the turndown collar portion, stitching the plies of the collar band to the turndown collar portion along said longitudinal edges, changing the direction of the line of stitching inwardly of the front edges of the turndown collar portion to thereby leave unstitched portions which extend across the front edges of the turndown collar portion, turning over the plies of the collar band to conceal the unfinished edge of the turndown collar portion, and then overstitching the top longitudinal edge of the collar band including the unstitched portions thereof.

6. The method of making a collar having a turndown collar portion and a collar band having at least two plies, comprising forming the top edges of the end portions of the collar band of less height than the top edges of the rest of the collar band to form tab members, stitching together the plies of the tab members, turning over and creasing the plies of the collar band upon the unfinished longitudinal edges thereof, inserting the turndown collar portion between the turned and creased plies of the collar band so that the adjacent front edges of the turndown collar portion are located inwardly of the stitched tab members, and then overstitching the top longitudinal edge of the collar band adjacent the crease including the formerly unstitched portions of the collar band.

MORRIS L. KAPLAN.